United States Patent [19]

Sutherland

[11] Patent Number: 5,616,542
[45] Date of Patent: Apr. 1, 1997

[54] OIL WITH ASYMMETRIC RADIAL POLYMER HAVING BLOCK COPOLYMER ARM

[75] Inventor: Robert J. Sutherland, Houston, Tex.

[73] Assignee: Shell Oil Company, Houston, Tex.

[21] Appl. No.: 627,294

[22] Filed: Apr. 3, 1996

[51] Int. Cl.$^6$ ................................................ C10M 155/02
[52] U.S. Cl. .................................... 508/207; 508/591
[58] Field of Search .................................. 508/207, 591

[56] References Cited

U.S. PATENT DOCUMENTS

| | | |
|---|---|---|
| H1,464 | 7/1995 | Chin et al. . |
| Re. 27,145 | 6/1971 | Jones . |
| 3,772,196 | 11/1973 | St. Clair et al. . |
| 3,835,053 | 9/1974 | Meier et al. . |
| 3,985,830 | 10/1976 | Fetters et al. . |
| 4,116,917 | 9/1978 | Eckert . |
| 4,156,673 | 5/1979 | Eckert . |
| 4,213,869 | 7/1980 | Kosinsky .................. 508/209 |
| 4,444,953 | 4/1984 | St. Clair . |
| 4,849,481 | 7/1989 | Rhodes et al. . |
| 5,070,131 | 12/1991 | Rhodes et al. . |
| 5,229,464 | 7/1993 | Erickson et al. . |
| 5,272,211 | 12/1993 | Sutherland et al. . |
| 5,278,252 | 1/1994 | Rhodes et al. .............. 508/591 |
| 5,302,667 | 4/1994 | Rhodes et al. . |
| 5,344,887 | 9/1994 | Sutherland et al. . |
| 5,360,564 | 11/1994 | Sutherland et al. . |
| 5,360,875 | 11/1994 | Masse et al. . |
| 5,369,175 | 11/1994 | Hoxmeier et al. . |
| 5,446,093 | 8/1995 | Hoxmeier et al. . |
| 5,447,995 | 9/1995 | Hoxmeier et al. . |

*Primary Examiner*—Margaret Medley

[57] ABSTRACT

An oil composition containing a hydrogenated radial polymer having three rubbery diene arms and one block copolymer arm having a terminal resinous block is provided. It has been found that these asymmetric radial components impart a disproportionately good high temperature/high shear rate viscosity, thus enhancing oil performance under the severe conditions encountered in many modern internal combustion engines.

19 Claims, 1 Drawing Sheet

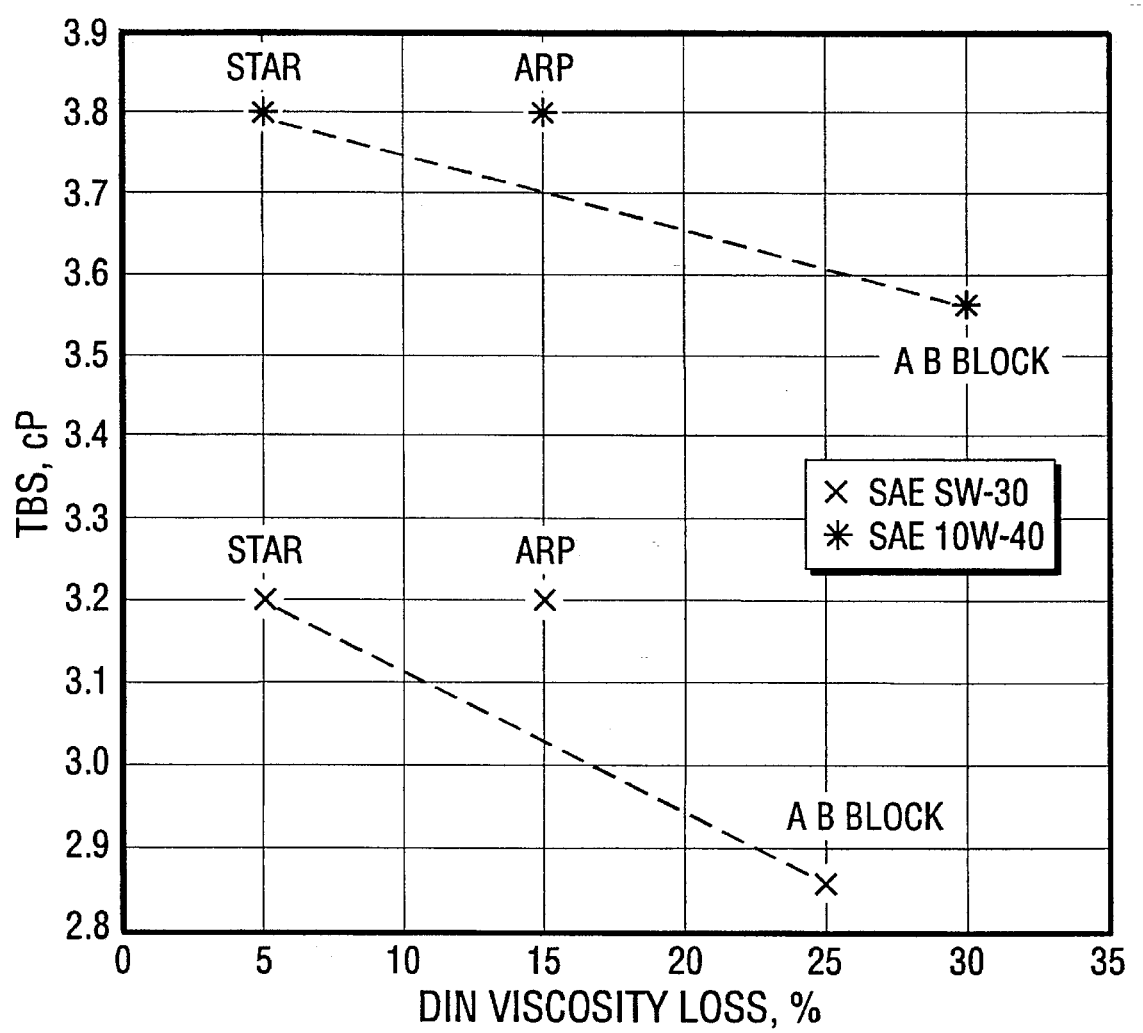

OIL WITH ASYMMETRIC RADIAL POLYMER HAVING BLOCK COPOLYMER ARM

BACKGROUND OF THE INVENTION

It is known to adjust the viscosity characteristics of oil through the use of polymeric additives such as ethylene-propylene copolymers, ethylene-propylene dienemonomer copolymers, polyisobutylene, polymethacrylate copolymers, and hydrogenated diene-styrene copolymers. It is known to form both random and block styrene-diene copolymers with the block polymers being formed by either sequential polymerization or coupling. In addition to simple difunctional coupling agents which produce a linear polymer it is known to form a coupling agent in-situ by the polymerization of a monomer having two separately polymerizable vinyl groups such as divinylbenzene. This gives a star polymer having from about 6 to as many as 50 or more arms. It is also known to couple polymer chains with tetravalent silicon compounds such as silicon tetrachloride. However, after the first two chlorine atoms are replaced by polymer chains the other two positions become increasingly more difficult to substitute and consequently, the polymers can turn out to be linear or mixtures of 3-armed radial polymers.

Consequently, styrene-diene oil additives have been made using in-situ produced coupling agents from divinylbenzene to give a large number of arms when star polymers were desired. Sequential polymerization or simple difunctional coupling agents have been used for the production of linear polymers for use in oil applications. Tetravalent silicon coupled polymers have heretofore not been considered candidates for commercial viscosity index improvers.

The viscosity of lubricating oils varies with temperature. In general, oils are identified by a viscosity index which is a function of the oil viscosity at a given lower temperature and a given higher temperature. The given lower temperature and the given higher temperature are given in an ASTM test procedure (ASTM D2270). Currently, the lower temperature specified in the test is 40° C. and the higher temperature specified in the test is 100° C. Historically, a high viscosity index (less decrease in viscosity with increasing temperature) has been sought for commercial oil formulations. In fact, however, the viscosity index is only one indicator of oil quality. More relevant are oil characteristics at the extreme operating conditions actually encountered. Such extreme conditions include temperatures of from about −40° to 150° C. and high shear rates comparable to those existing in the bearings and pumps of modern engines.

SUMMARY OF THE INVENTION

It is an object of this invention to provide oil compositions having improved viscosity characteristics.

In accordance with this invention, an oil composition is provided comprising a tetravalent silicon coupled polymer having (a) about three rubbery diene arms and (b) one block copolymer arm having at least one rubbery diene block and a block of polymerized monovinyl arene having a molecular weight within the range of 20,000–50,000.

BRIEF DESCRIPTION OF THE DRAWING

The drawing, forming a part hereof, is a plot of percent viscosity loss (using the Kurt Orbahn Rig, ASTM D-3945A) versus high-temperature, high-shear-rate viscosity (measured in the tapered bearing simulator, ASTM D-4683) for oil formulations using commercial VII polymers (star and AB block) and using asymmetric radial polymer (ARP) formulations in accordance with this invention.

DETAILED DESCRIPTION OF THE INVENTION

Applicants have found surprisingly at a given percent viscosity loss that tetravalent silicon coupled polymer having three rubbery diene arms and a fourth arm with at least one rubbery block and a monovinylarene block having a molecular weight within the range of 20,000–50,000 imparts a disproportionately high high-temperature, high-shear-rate viscosity value as measured by tapered bearing simulator (TBS) according to ASTM D4683.

It is essential that the tetravalent silicon coupled polymers have at least a majority of the molecules having about three rubbery diene arms and one block copolymer arm. That is, it is essential to have a greater proportion of the desired three arms of rubbery diene and one arm of block copolymer than the 42% which is obtained as a statistical average. This can be done by taking advantage of the fact that the fourth position on the tetravalent silicone compound is more difficult to substitute and therefore living polymer chains can be contacted with the tetravalent silicone coupling agent under conditions to produce three rubbery diene arms ($R^3$) per molecule. Block copolymers arms having a polymerized monovinyl aromatic block and at least one polymerized diene block can be produced either in-situ or separately and thereafter reacted with the tetravalent silicon coupled rubbery diene block composition using a coupling activator which forces the substitution of the fourth position. Polar compounds of the type employed for increasing the vinyl content of diolefin polymer function in this context as coupling activators. A particularly preferred activator is ethylene glycol dimethyl ether (glyme). Such techniques are disclosed in Hoxmeier et al U.S. Pat. No. 5,447,995 (Sep. 5, 1995), the disclosure of which is hereby incorporated by reference, it being understood that the block copolymer fourth arm is produced as a living polymer by first forming the polymerized monovinyl aromatic block and thereafter the polymerized diene block so that the living end of the arm is associated with the end of the polymerized diene block so as to give a terminal monovinyl aromatic block. Alternatively, the fourth arm can be produced by first polymerizing a diene block ($R^1$) followed sequentially by a monovinyl aromatic block (A) and thereafter polymerizing a second diene block ($R^2$). Thus the molecule can be broadly viewed as follows:

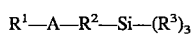

$$R^1-A-R^2-Si-(R^3)_3$$

wherein the molecular weights of each segment are about $R^1$=0–10,000; $R^2$=1,000–100,000; $R^3$=10,000–200,000; A=20,000–50,000 and Si is the silicon residual from the coupling agent.

As noted hereinabove, the polymer molecules are predominantly made up of three rubbery diene arms ($R^3$) and one block copolymer arm attached to the remnant of the tetravalent silicon coupling agent, which remnant will generally be the silicon atom. Preferably at least 70% of the molecules have three rubbery diene arms and one block copolymer arm, more preferably at least 90%.

The asymmetric radial polymers utilized in this invention are further hydrogenated to such a degree that the unsaturation of the elastomeric diene component is greatly reduced without significant hydrogenation of the aromatic unsaturation in the vinylarene block component. Generally, at least 90% of the unsaturation in the diene component is hydrogenated and no more than 25%, preferably less than 10% of the aromatic unsaturation is hydrogenated. Such hydrogenation techniques are known in the art and disclosed, for instance, in Jones, Reissue 27,145 (Jun. 22, 1971), the disclosure of which is hereby incorporated by reference. Thus, in the case of the preferred diene, isoprene, the resulting rubbery components can be viewed as ethylene/propylene copolymers.

While conjugated dienes of 4 to 8 carbon atoms are broadly applicable to this invention, it is highly preferred that the diene monomer be isoprene or else be butadiene polymerized under conditions designed to give a high 1,2 addition so as to provide ethyl side branches. These arms have been referred to hereinabove as rubbery diene arms and are preferably homopolymers of the diene although random copolymer with another diene or a small amount of monovinyl unsaturated aromatic component can be utilized in the formation of the rubbery diene blocks.

The rubbery diene arms $R^3$ preferably have a molecular weight within the range of 10,000–200,000, more preferably within the range of 20,000–150,000. The block copolymer arm has a rubbery diene segment which can be made up of monomers having the same scope as set out hereinabove for the rubbery diene arms; generally, the diene will be the same as that used in the formation of the rubbery diene arms, most preferably it will be isoprene. The monovinyl substituted aromatic compound block can be made from any 8 to 20 carbon atom monovinyl aromatic compound, but is preferably a homopolymer of styrene or styrene homologs such as α-methylstyrene, most preferably styrene. As noted hereinabove, this block has a molecular weight within the range of 20,000–50,000, preferably within the range of 30,000–45,000. These molecules are further characterized in that the diene block of the block copolymer arm has a molecular weight which is equal to or less than the molecular weight of each of the rubbery diene arms. Preferably, the molecular weight of the diene block $R^2$ of the block copolymer arm is within the range of 1,000 to 100,000, more preferably 2,000 to 80,000.

For an ionically polymerized linear polymer, the polymer is essentially monodispersed and it is both convenient and adequately descriptive to report the "peak" molecular weight of the narrow molecular weight distribution observed. Such methods are well known and described in patents, including Erickson et al, U.S. Pat. No. 5,229,464 (Jul. 20, 1993), the disclosure of which is hereby incorporated by reference. These measurements approximate weight average molecular weight although the values obtained will be slightly higher than a true weight average molecular weight. As it relates to the weight of the arms of the molecules of the polymers used in this invention, an aliquot of the polymerization reaction mixture can be removed at the appropriate time in order to gauge the molecular weight, for instance of the rubbery diene block prior to coupling or of the monovinyl substituted aromatic compound block prior to introduction of the diene monomer for the production of the diene component thereof. Since polystyrene is used to calibrate, this directly gives the absolute molecular weight of polystyrene blocks. From this and the known percent styrene, the absolute molecular weight of the diene blocks can be calculated.

Measurement of the true molecular weight of a final coupled radial polymer is not as straightforward or as easy to make using gel permeation chromatography (GPC). This is because the radial molecules do not separate and elute through the packed GPC columns in the same manner as do linear polymers used for the calibration, and, hence the time of arrival at a UV or a refractive index detector is not a good indicator of the molecular weight. A good analytical method to use for a radial polymer is to measure the weight average molecular weight by light scattering techniques. The sample is dissolved in a suitable solvent at a concentration less than 1 gram of sample per 100 milliliters of solvent and filtered using a syringe and porous membrane filters of less than 0.5 micron pore size directly onto the light scattering cell. The light scattering measurements are performed as a function of scattering angle and polymer concentration using standard procedures. The differential refractive index (DRI) of the sample is measured at the same wave length and in the same solvent used for the light scattering. This results in a molecular weight value which approximates weight average molecular weight.

Generally speaking, all synthetic and mineral based oils or mixtures thereof are suitable in the practice of this invention. Synthetic oils are exemplified by polyalphaolefins and polymethacrylate esters. Mineral based oils useful herein include highly refined petroleum distillates such as solvent extracted or catalytically dewaxed oils. Examples of such mineral-based oils include aromatic oils, non-aromatic oils, and naphthenic oils. Mixtures of mineral oils and synthetic oils are also useful in the practice of the invention. The selection of an appropriate oil or mixture of oils is well within the competence of those skilled in the art.

The inventive oil formulations generally contain a detergent inhibitor package which is sometimes referred to simply as a "DI package." The DI package typically contains a detergent, an ashless dispersant, an antioxidant, a friction modifier, an anti-wear agent, a corrosion inhibitor, and other components all of which are well known in the art and sold commercially, for instance, as a package by companies such as the Lubrizol Corporation. Examples are Lubrizol® 8855G, which can be used alone or in combination with Lubrizol® 8563.

Another conventional component utilized in the inventive oil formulation is a pour point depressant. Such materials act to prevent wax crystals from growing into an interlocking network and are frequently acrylic copolymers such as alkyl methacrylate copolymers. They are readily available commercially being sold, for instance, under the trademark Acryloid® 155 and Acryloid 160 by the Rohm and Haas Corporation.

Again, all of these conventional components of oil formulations are well known in the art and are disclosed, for instance, in Sutherland et al, U.S. Pat. No. 5,360,564, (Nov. 1, 1994), the disclosure of which is hereby incorporated by reference.

The quantities of ingredients in the oil formulations of this invention are within the ranges normally utilized in the art. Typical inventive oil formulation will comprises the following: from about 75 to 95 weight percent of base oil; from about 0.1 to 5 weight percent of the asymmetric radial polymer; from about 0.1 to 1 weight percent of a pour point depressant and from about 5 to 20 weight percent of a DI package.

All of the data presented herein relate to fully formulated lubricating oil compositions, i.e. those having all of the ingredients typically found in a commercial lubricating oil as sold for internal combustion engines, such as gasoline and diesel engines. By fully formulated, it is simply meant that the oil contains all of the ingredients in a commercial oil as opposed to just the oil and the viscosity index improver.

EXAMPLES

Example 1

Five asymmetric radial polymers were prepared as disclosed in said U.S. Pat. No. 5,447,995 patent utilizing isoprene for both the production of the rubbery arms and the diene block of the block copolymer. Styrene was utilized to produce the vinylarene block of the block copolymer arm. The coupling agent utilized was silicon tetrachloride. The block copolymer arm was prepared by anionically polymerizing isoprene to the desired molecular weight and the coupling facilitated by carrying out the reaction of the rubbery arms with the silicon coupling agent. The styrene-isoprene fourth arm was then polymerized and coupled with the aid of GLYME (1,2-dimethoxyethane). The polymer was hydrogenated using a nickel/aluminum catalyst as is well known in the art. During the polymerization, aliquots were taken out at the appropriate times and analyzed by GPC in order to get the molecular weight of the various arms. The compositions are set out hereinbelow in Table 1, labeled "Asymmetric Radial Polymer (ARP) 1–5. The polymers were chosen so as to study the effect of various lengths of the terminal vinylarene block and to study the effect of the length of the rubbery block of the block copolymer arm.

TABLE 1

| Sample # | S-E/P-Si(E/P)₃¹ | Polystyrene wt % |
|---|---|---|
| ARP 1 | 17-15-Si(28)₃ | 14.7 |
| ARP 2 | 14-25-Si(24)₃ | 12.6 |
| ARP 3 | 15-15-Si(14)₃ | 20.8 |
| ARP 4 | 40-25-Si(70)₃ | 14.5 |
| ARP 5 | 30-75-Si(30)₃ | 15.4 |

¹The numbers shown represent molecular weight in thousands.

Oil concentrates of each polymer were prepared, and then blended into fully formulated SAE 5–30 motor oils for rheological testing. An amount of polymer was utilized so as to give a 100° C. kinematic viscosity of about 10.9 centistokes. This was chosen so as to test the thickening effectiveness of the various polymers and to provide a comparable basis for comparison. The 100° C. kinematic viscosity is a low shear viscosity test that best demonstrates the thickening effect of the polymer. The other three test runs were: (1) cold cranking simulation (CCS) viscosity at −25° C., (2) mini rotary viscometer, using temperature profile-1 (MRV-TP1) viscosity measured at −30° C., and (3) tapered bearing simulator (TBS) viscosity measured at 150° C. and 10⁶ Hz. The CCS viscosity, which is measured in centipoise, is a screening test to be sure the value is not so high that an engine would have trouble cranking (Limits for these tests are specified in a document known as SAE J-300, which is well known in the art). The MRV-TP1 test is useful to be sure that such an engine, once started, will have oil pumped to critical areas requiring lubrication. The tapered bearing simulator (TBS) test depicts the oil's characteristics under conditions of high temperature and high shear rate which are conditions which encountered in modern engines and has been related to oil film thickness in engines. The test measures viscosity at 150° C. (TBS) and a shear rate of 10⁶ Hz, the measurement again being in centipoise. The results are set out hereinbelow in Table 2.

TABLE 2

Rheological Properties of SAE 5W-30 Engine Oils

| Sample ID | wt % VII | KV¹ 100° C. cSt | CCS² −25° C., cP | TPI-MRV³ −30° C., cP | TBS⁴ 150° C., cP |
|---|---|---|---|---|---|
| ARP 1 | 1.30 | 10.9 | 3302 | 14,968 | 3.39 |
| ARP 2 | 1.20 | 10.8 | 3274 | 13,821 | 3.39 |
| ARP 3 | 1.61 | 10.7 | 3516 | 17,647 | 3.44 |
| ARP 4 | 0.70 | 11.0 | 2926 | 11,199 | 3.22 |
| ARP 5 | 0.80 | 10.8 | 3035 | 16,025 | 3.25 |

¹ASTM D445
²ASTM D2602
³ASTM D4684
⁴ASTM D4683

As can be seen, ARP 3 was insufficient in thickening power as evidenced by the larger amount necessary to achieve the desired kinematic viscosity. This is attributed to the insufficiently large vinyl aromatic block, which probably resulted in the failure of the ARP polymer to form micelles. All of the asymmetric radial polymers gave outstanding high temperature, high shear rate viscosity results. However, only ARP 4 had a temperature profile viscosity (TPI-MRV) comparable to the best commercial formulations available. Consequently, it was chosen for further evaluation. First, a duplicate formulation with ARP 4 identical to that set out hereinabove was prepared in the same SAE 5W-30 fully formulated oil and the tests re-run along with a third test which is another important test as it relates to the severe conditions encountered by oils in modern internal combustion engines, the diesel injector nozzle test, also known as the Kurt Orbahn test (ASTM D3945A). This test determines the percent viscosity lost for polymer-containing oils resulting from polymer degradation in the high shear nozzle device. The test gives minimum interference from thermal or oxidative effects, thus being a true test of the high shear stability of the polymer. The test is run for 30 cycles as set out in ASTM 3945 procedure A. The results are set out hereinbelow in Table 3 and also in the lower curve of the drawing.

TABLE 3

Rheological Properties of SAE 5W-30 Engine Oils

| VII ID | wt % VII | KV 100° C., cST | CCS −25° C., cP | TP1-MRV −30° cP | TBS 150° C., cP | DIN VIS Loss, % |
|---|---|---|---|---|---|---|
| ARP 4 | 0.70 | 11.0 | 2962 | 10,953 | 3.17 | 17 |
| AB Block¹ | 0.60 | 11.0 | 2847 | 10,197 | 2.86 | 25³ |
| Star² | 0.80 | 11.1 | 2938 | 10,693 | 3.21 | 8⁴ |

¹Commercial hydrogenated isoprene-styrene VI improver having 40,000 mw styrene block and 120,000 mw hydrogenated isoprene block
²Commercial hydrogenated DVB coupled isoprene star polymer having 40,000 mw arms
³Value taken from prior SAE 10W-30 fully formulated oil having the same commercial AB block copolymer
⁴Value taken from prior SAE 10W-30 fully formulated oil having the same commercial star polymer As can be seen, the ARP was intermediate in thickening power between the two commercial polymers. It was comparable on the MRV-TP1 test (ASTM D4684) (comparison is against commercial formulations which represent the commercial products available). It was also comparable on the other low temperature test, the cold cranking simulator.

Most significant, however, is the relationship between the diesel injector test viscosity loss (resistance to degradation under high shear conditions) and the TBS test (high-temperature, high-shear-rate viscosity). The figure, lower curve, plots the viscosity loss against the high temperature/high shear rate viscosity for the commercial AB linear polymer and the commercial star polymer. An imaginary line is drawn between these two points. As can be seen, the asymmetric radial polymer used in this invention has a disproportionately high TBS viscosity, that is, higher high-temperature, high-shear-rate viscosity. This is extremely significant since it shows that rather than having to accept the usual compromise between viscosity loss and high temperature/high shear rate properties (that would be inherent in deciding between the commercial AB block polymer and the commercial star polymer), the polymers utilized in this invention give disproportionately high, high-temperature, high-shear-rate viscosity lubricating characteristics.

Example 2

In this example, the identical ARP 4 polymer, the identical AB block commercial VI improver and the identical star commercial VI improver were blended into SAE 10W-40 fully formulated oil. The blends were made according to SAE J-300 for SAE 10W-40 oils and were blended to a 14.5 cSt kinematic viscosity. The cold cranking simulator test was run at −20° C. rather than −25° C. and the MRV-TP1 test was run at −25° C. rather than −30° C. These differences reflect the fact that it was a heavier weight oil formulation. The results are set out herein below in Table 4.

TABLE 4

Rheological Properties of SAE 10W-40 Engine Oils

| VII ID | wt % VII | KV 100° C., cST | CCS −20° C., cP | TP1-MRV −25° cP | TBS 150° C., cP | DIN VIS Loss, % |
|---|---|---|---|---|---|---|
| ARP 4 | 0.74 | 14.3 cST | 3192 cP | 15,879 cP | 3.84 cP | 15 |
| AB Block | 0.65 | 14.6 | 3325 | 13,794 | 3.56 | 30 |
| Star | 0.90 | 14.5 | 3227 | 14,665 | 3.81 | 4 |

As can be seen from this Table and from the plot of the data in the upper curve of the Figure, the same disproportionately high, high-temperature, high-shear-rate viscosity for a given viscosity loss was shown by the polymers used in this invention as was found in the first example utilizing the 5W-30 oil.

While this invention has been described in detail for the purpose of illustration, it is not to be construed as limited thereby but is intended to cover all changes and modifications within the spirit and scope thereof.

What is claimed is:

1. A lubricating oil composition comprising:
   (a) an oil component selected from the group consisting of synthetic oil, mineral oil and mixtures thereof; and
   (b) a hydrogenated asymmetric radial polymer, molecules of which have a core composed of the remnant of a tetravalent silicon coupling agent, a plurality of rubbery arms comprising polymerized diene units each having a molecular weight within the range of 10,000–200,000 and a block copolymer arm having at least one polymerized diene block and a polymerized monovinyl aromatic compound block;
   said monovinyl aromatic block having a molecular weight within the range of 20,000–50,000, said polymerized diene block of said block copolymer arm having a molecular weight which is equal to or lower than the molecular weight of said rubbery arms, and wherein said molecules are predominantly made up of three of said rubbery arms and one of said block copolymer arms.

2. An oil composition according to claim 1 wherein said hydrogenated asymmetric radial polymer is present in an amount within the range of 0.1–5% by weight based on the weight of said composition.

3. A composition according to claim 2 wherein at least 80 weight percent of molecules making up said hydrogenated radial polymer have three of said rubbery polymerized diene arms and wherein said core is a silicon atom.

4. A composition according to claim 3 wherein said rubbery diene arms each are homopolymer arms.

5. A composition according to claim 3 wherein the diene is isoprene or butadiene and the monovinyl aromatic compound is styrene.

6. A composition according to claim 3 wherein said diene is isoprene and said monovinyl aromatic compound is styrene.

7. A composition according to claim 3 wherein said monovinyl aromatic blocks have a molecular weight within the range of 30,000–45,000.

8. A composition according to claim 3 wherein said diene blocks each have a molecular weight within the range of 20,000–100,000.

9. A composition according to claim 3 wherein said oil is a mineral oil.

10. A composition according to claim 1 wherein said hydrogenated radial polymer has at least 90 percent of original unsaturation in said polymerized diene hydrogenated and wherein less than 10 percent of aromatic unsaturation in said polymerized aromatic compound is hydrogenated.

11. A fully formulated motor oil composition comprising:
    (a) an oil component selected from the group consisting of synthetic oil, mineral oil and mixtures thereof; and
    (b) a hydrogenated radial polymer, molecules of which have a core composed of the remnant of a tetravalent silicon coupling agent, a plurality of rubbery arms comprising polymerized diene units each having a molecular weight within the range of 10,000–200,000 and a block copolymer arm having at least one polymerized diene block and a polymerized monovinyl aromatic compound block;
    said monovinyl aromatic block having a molecular weight within the range of 20,000–50,000, said polymerized diene block of said block copolymer arm having a molecular weight which is equal to or lower than the molecular weight of said rubbery arms, and wherein said molecules are predominantly made up of three of said rubbery arms and one of said block copolymer arms; and
    (c) 5–20 weight percent based on the weight of said formulation a detergent inhibitor package and 0.1–1 weight percent based on the weight of said oil formulation a pour point depressant.

12. An oil composition according to claim 11 containing from about 0.1 to 5% by weight of said hydrogenated radial polymer based on the total weight of said composition.

13. A composition according to claim 11 wherein at least 80 weight percent of molecules making up said hydrogenated radial polymer have three rubbery polymerized diene homopolymer arms and wherein said core is a silicon atom.

14. A composition according to claim 13 wherein said diene is isoprene or butadiene and said monovinyl aromatic compound is styrene.

15. A composition according to claim 11 wherein said diene of said rubbery diene arms and said diene of said block copolymer arm are both isoprene and said monovinyl aromatic compound is styrene.

16. A composition according to claim 15 wherein said monovinyl aromatic blocks have a molecular weight within the range of 30,000–45,000.

17. A composition according to claim 15 wherein said diene arms each have a molecular weight within the range of 20,000–150,000.

18. A composition according to claim 11 wherein said hydrogenated radial polymer has at least 90 percent of original unsaturation in said polymerized diene hydrogenated and wherein less than 10 percent of aromatic unsaturation in said polymerized aromatic compound is hydrogenated.

19. A fully formulated motor oil composition comprising:

from 75–95 weight percent mineral oil;

a hydrogenated radial polymer having about 3 polymerized isoprene homopolymer rubbery arms each having a molecular weight within the range of 10,000–200,000, a core which is the remnant of a silicon tetrachloride coupling agent and one block copolymer arm having at least one polymerized isoprene homopolymer block and a polymerized styrene homopolymer block; said styrene block having a molecular weight within the range of 20,000 to 50,000 and wherein said polymerized diene block of said block copolymer arm has a molecular weight which is equal to or lower than the molecular weight of said rubbery arms;

5–20 weight percent based on the weight of said oil formulation of a detergent inhibitor package; and 0.1–1 weight percent based on the weight of said oil formulation of a polymer pour point depressant; and wherein said radial polymer is present in an amount sufficient to give a kinematic viscosity of about 5 to about 30 centistokes.

* * * * *